(12) United States Patent
Koreeda et al.

(10) Patent No.: US 8,376,628 B2
(45) Date of Patent: Feb. 19, 2013

(54) OPTICAL CONNECTOR PLUG

(75) Inventors: Yuichi Koreeda, Tokyo (JP); Naoki Katagiyama, Tokyo (JP); Yasutaka Hiroki, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 276 days.

(21) Appl. No.: 13/013,753

(22) Filed: Jan. 25, 2011

(65) Prior Publication Data

US 2011/0211792 A1    Sep. 1, 2011

(30) Foreign Application Priority Data

Feb. 26, 2010  (JP) ................................. 2010-042202

(51) Int. Cl.
    *G02B 6/38*         (2006.01)
(52) U.S. Cl. ............................... 385/75; 385/60; 385/72
(58) Field of Classification Search .................... 385/72, 385/75
    See application file for complete search history.

(56) References Cited

U.S. PATENT DOCUMENTS

| 7,074,066 B2 | 7/2006 | Pepe | |
| 7,744,288 B2 * | 6/2010 | Lu et al. | 385/60 |
| 2001/0036762 A1 * | 11/2001 | Payson et al. | 439/320 |

FOREIGN PATENT DOCUMENTS

| JP | 2001-141961 | 5/2001 |
| JP | 2002-228873 | 8/2002 |
| JP | 2007-108741 | 4/2007 |
| JP | 2007-537462 | 12/2007 |
| WO | WO 2005/101078 | 10/2005 |

OTHER PUBLICATIONS

Office action issued on Jan. 31, 2012 by the Japanese Patent Office for corresponding patent application JP 2010-042202.

* cited by examiner

*Primary Examiner* — Jerry Rahll
(74) *Attorney, Agent, or Firm* — David N. Lathrop

(57) ABSTRACT

A stopper 50 is fixed to an optical connector 10, and the optical connector 10 is accommodated in an opening section 21 of a housing 20. The housing 20 is engaged with the stopper 50 so as to be displaceable with respect to the stopper 50 by a predetermined amount in a direction of inserting the optical connector 10 to a receptacle, and the stopper 50 is biased rearward by a coil spring 40 with respect to the housing 20. The free end of a clip piece 15 is placed on the free end of a latch piece 14 of the optical connector 10, and the free end of the clip piece 15 is placed on an inclination surface 23a at the front end of a concave section 23 formed on an inner wall surface of the opening section 21. At the time of detachment from the receptacle, the housing 20 is displaced in a direction to be pulled out against the biasing force of the coil spring 40. Accordingly, the clip piece 15 and the latch piece 14 are pushed down by the inclination surface 23a to release the lock of the latch piece 14. The detachment from the receptacle can be made in one motion.

4 Claims, 14 Drawing Sheets

OPTICAL CONNECTOR PLUG

TECHNICAL FIELD

The present invention relates to an optical connector plug housing an optical connector holding an optical fiber terminal.

BACKGROUND ART

FIG. 1 shows a configuration described in Japanese Patent Application Laid Open No. 2007-537462 as a prior art example of a connector (plug) used for connecting an optical fiber. In FIG. 1, reference numeral 1 denotes an optical connector (internal fiber connector assembly), reference numeral 2 denotes an external housing section, and reference numeral 3 denotes a collar section.

The optical connector 1 has a middle portion thereof accommodated and held in the external housing section 2. At an end, a ferrule 1a which aligns and holds an end section of the optical fiber is placed. The collar section 3 is attached to the external housing section 2 and to be capable of rotating.

The optical connector 1 is formed with a latch 4 which has a fixed rear and extends forward. The latch 4 has an inclination arm section 5 extending forward from the rear up to an uppermost contact surface 5a, a vertical section 6 extending vertically downward from the end of the inclination arm section 5, and a cantilever section 7 supported by the vertical section 6 and extending forward. At the end of the cantilever section 7, an inclination surface 7a and a lock edge 7b are provided.

The collar section 3 has a cylinder shape, and, at the front end thereof, a cam 8 is formed to protrude from the inner circumferential surface.

When the plug having the configuration described above is to be connected with another connector, the collar section 3 is rotated to cause the cam 8 to rotate and engage with uppermost contact surface 5a of the latch 4. Accordingly, the uppermost contact surface 5a is pushed to push down the latch 4, enabling the optical connector 1 to be inserted to the other connector. By rotating the collar section 3 to recover the latch 4, the lock edge 7b is locked to the other connector, thus making a connection.

SUMMARY OF THE INVENTION

When the plug having the configuration described above is to be detached from the other connector, an operation becomes necessary in which the collar section 3 is rotated to cause the cam 8 to push down the latch 4 so that the lock is released and the plug is pulled out in that state. That is, two motions of rotating the collar section 3 and pulling out the plug are necessary.

Also, since the optical connector 1, protruding greatly forward from the collar section 3, is easily damaged or stained, handling requires appropriate care.

Further, depending on the rotated position of the collar section 3, for example, there is a possibility that that the latch 4 is kept in a state pushed down by the cam 8 even in a connected state with the other connector. That is, there is a possibility that the latch 4 is kept in a deformed state. In this case, unreleased stress poses a risk of causing a failure such as plastic deformation or breakage of the latch 4 due to a creep phenomenon.

In view of such problems, an object of the present invention is to provide an optical connector plug of which connection and detachment can both be easily performed in one motion and of which an optical connector can be prevented from damage or stain.

According to this invention, an optical connector plug which houses an optical connector to be inserted and connected to an adapter and which is to be connected to a receptacle holding the adapter has a configuration including a latch piece formed on a surface of the optical connector, having a front end in an inserting direction toward the adapter as a fixed end and a rear end as a free end, extending so as to depart gradually from the surface, and including at a middle portion a protrusion which protrudes on both sides in a width direction, a clip piece formed on the surface, having a rear end in the inserting direction as a fixed end and a front end as a free end, the free end being placed on the free end of the latch piece, a stopper arranged on a rear end side in the inserting direction of the optical connector and coupled and fixed with the optical connector, a housing which engages with the stopper so as to be displaceable by a predetermined amount in the inserting direction with respect to the stopper and which accommodates the optical connector in an opening section at front in the inserting direction, and a biasing member which biases the stopper rearward in the inserting direction with respect to the housing, wherein the free end of the clip piece is placed on an inclination surface at a front end in the inserting direction of a concave section formed on an inner wall surface of the opening section, the latch piece is, at a time of connection with the receptacle, pushed down by the protrusion being pressed by a pressing section provided to the adapter entering into the opening section, recovers to an original state by the pressing section passing through the protrusion, and is locked to the adapter by the protrusion being placed at an engaging section formed on a far side of the pressing section, and, at a time of detachment from the receptacle, the housing is displaced against a biasing force of the biasing member whereby the clip piece together with the latch piece are pushed down by the inclination surface to release a lock to the adapter, and, after release of the lock, the latch piece and the clip piece recover to original states by the stopper being displaced by the biasing force of the biasing member.

Effects of the Invention

According to this invention, when the optical connector plug is to be detached from the receptacle, the detachment can be made in one simple pulling motion to release the lock of the latch piece. Thus, the detachment can be made easily.

Also, since the optical connector is accommodated and held in the housing, damage or stain of the optical connector can be prevented.

Further, since the latch piece recovers reliably to a predetermined original state both at the time of connection with the receptacle and at the time of detachment from the receptacle and is not pushed down to be kept to be in a deformed state, an accident causing a cut in the latch piece due to, for example, a creep phenomenon from unreleased stress can be avoided.

DETAILED DESCRIPTION OF THE EMBODIMENTS

An example of this invention is described below.

Figure 1:
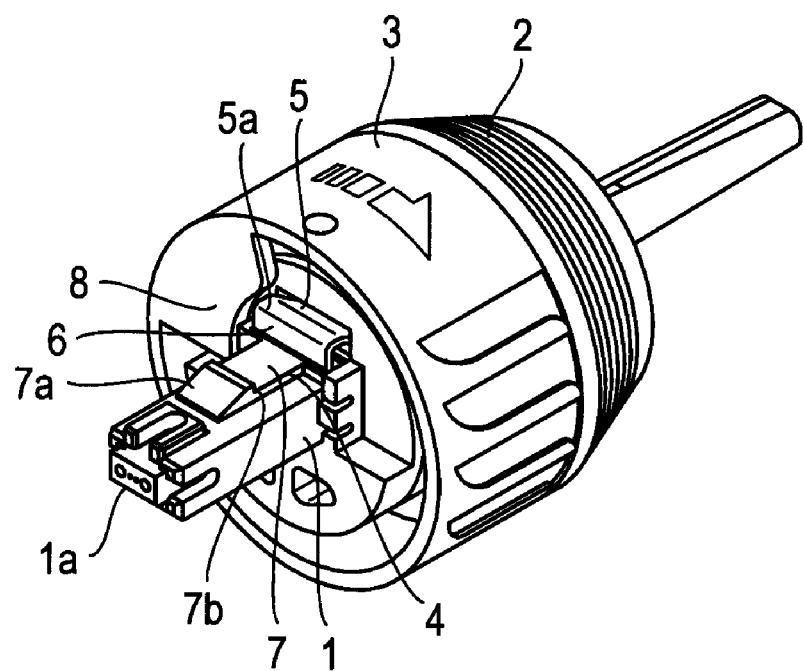
FIG. 1 is a perspective view showing a prior art example of a plug holding an optical connector.
Figure 2:
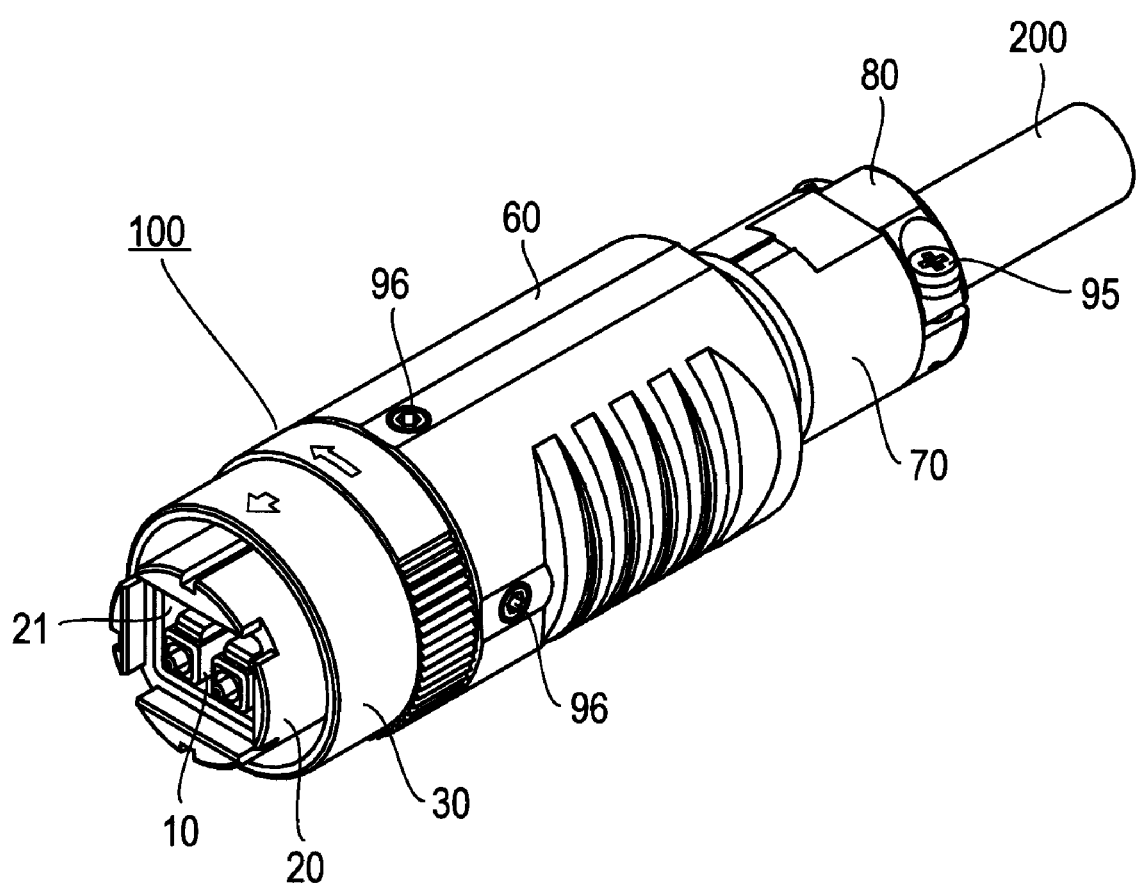
FIG. 2 is a perspective view showing the external appearance of an example of an optical connector plug according to this invention.
Figure 3:
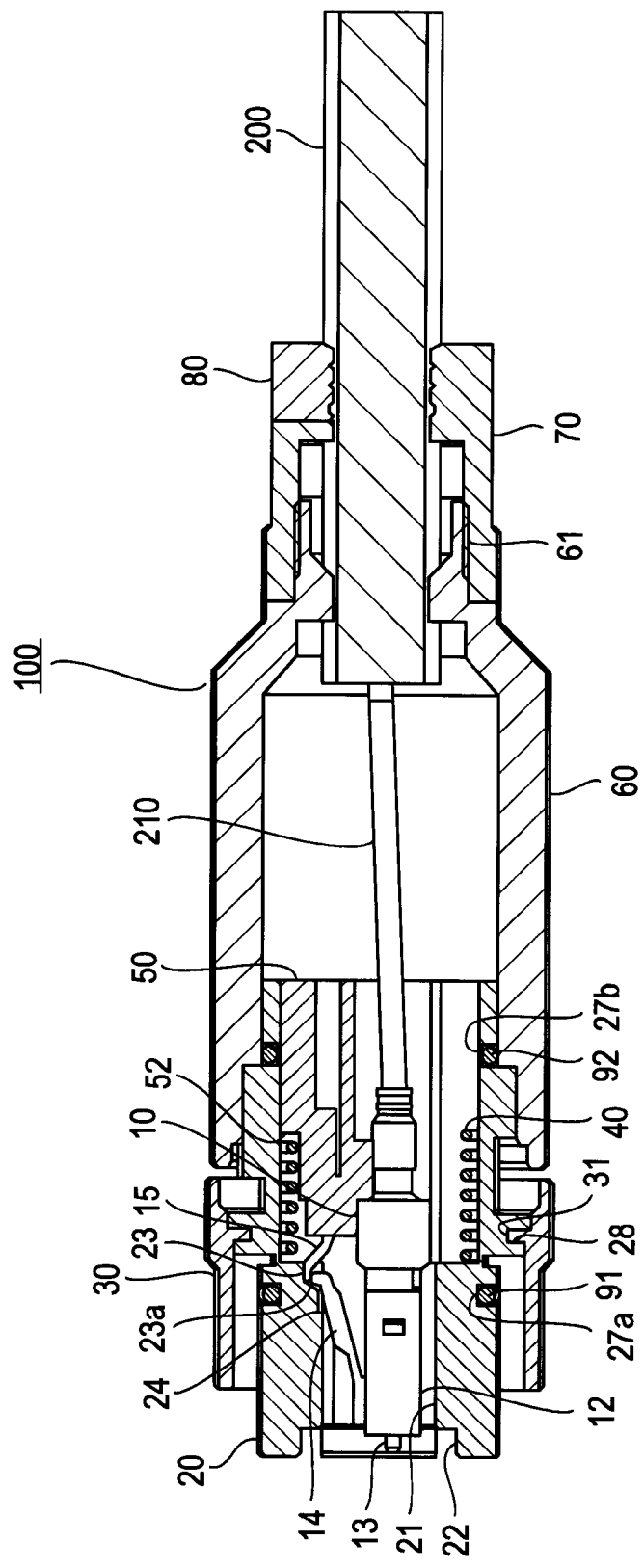
FIG. 3 is an enlarged sectional view of the optical connector plug shown in FIG. 2.
Figure 4:
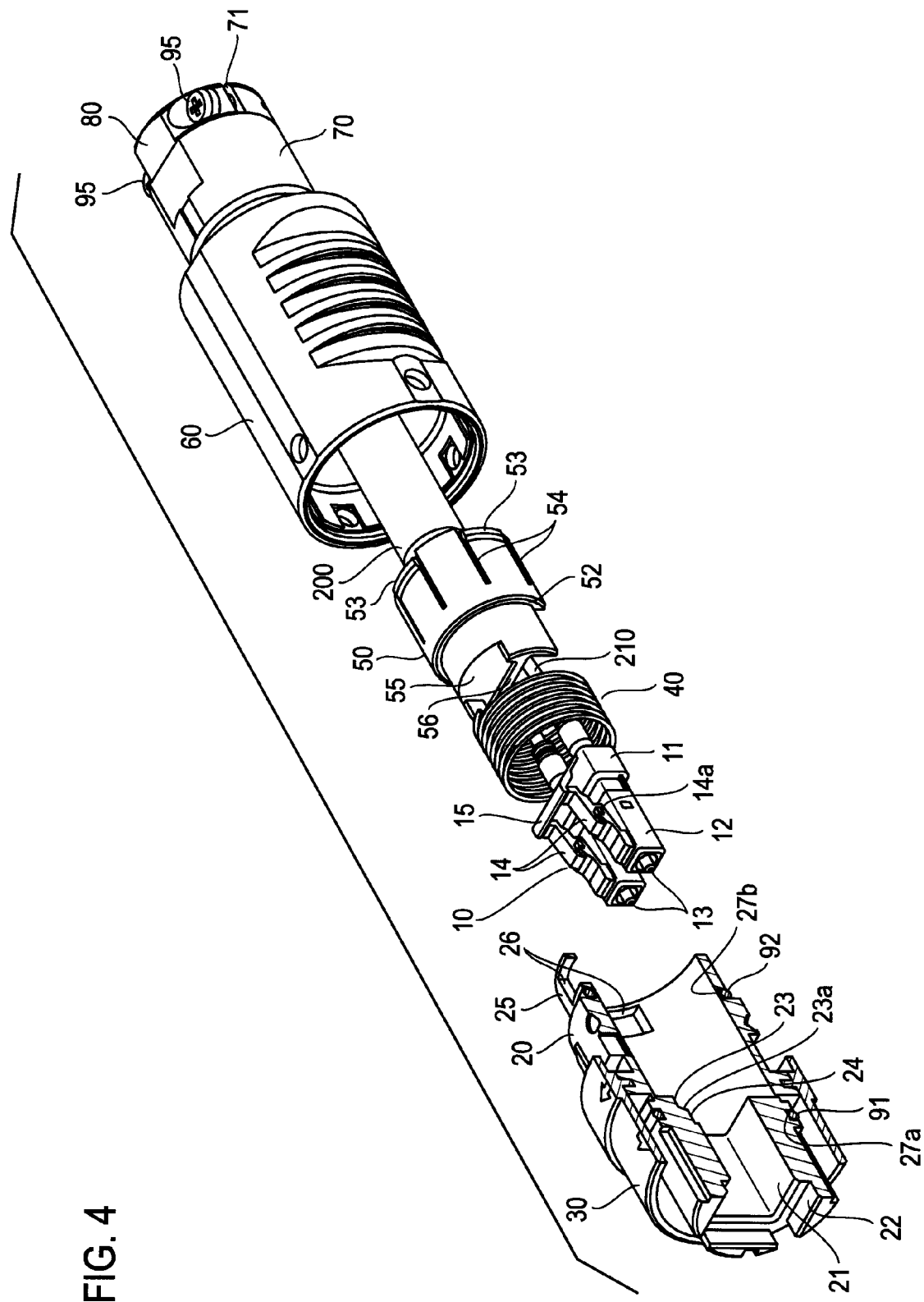
FIG. 4 is an exploded perspective view of the optical connector plug shown in FIG. 2.

FIG. 2 shows the external appearance of an example of the optical connector plug according to this invention, and FIG. 3 shows the sectional structure. FIG. 4 shows, partly in section, respective sections disassembled.

In this example, an optical connector plug 100 is configured of an optical connector 10, a housing 20, a coupling nut 30, a coil spring (bias member) 40, a stopper 50, an end bell 60, a gland nut 70, a clamp saddle 80, O-rings 91 and 92, and screws 95 and 96. The optical connector plug 100 is attached to the terminal of an optical fiber cable 200.

First, the configuration of the respective sections is described.

The optical connector 10 is a two-fiber connector in this example, and two optical fibers 210 guided by the optical fiber cable 200 are connected and held. The optical connector 10 includes a body frame 11 and two sleeves 12 protruding forward from the body frame 11, and a ferrule 13 holding the terminal of the optical fiber 210 is placed in each sleeve 12.

On the upper surface of the optical connector 10, a clip piece 15 and two latch pieces 14 are provided, which are formed to protrude from upper surfaces of the respective sleeves 12. In the latch piece 14, the front end in the inserting direction (i.e., side on which the ferrule 13 protrudes) where the optical connector 10 is to be inserted and connected to an adapter is a fixed end, and the rear end in the inserting direction is a free end toward which the latch piece 14 extends, gradually departing from the upper surface of the sleeve 12. In a middle portion in the extending direction of the latch piece 14, two protrusions 14a are formed to protrude on both sides in the width direction.

The clip piece 15 is formed to protrude from the upper surface of the body frame 11. Contrary to the latch piece 14, the rear end in the inserting direction toward the adapter is a fixed end, and the front end in the inserting direction is a free end. The clip piece 15 is wide, and the free end thereof is placed on the free ends of the two latch pieces 14.

The housing 20 has a cylinder shape as a whole, and, on the front side thereof, an opening section 21 configuring a rectangular-shaped opening is formed. On the front end inner wall surface of the opening section 21, a step section 22 is formed to be one step lower at each of four sides of a rectangle. Also, on the rear end inner wall surface of the opening section 21, a concave section 23 is formed. The concave section 23 is formed on one side of the rectangle of the opening section 21, and the front end is an inclination surface 23a. Note that, in this example, a shallow step section 24 is formed further in front of the inclination surface 23a.

In a rear side cylinder section 25 of the housing 20, three engagement windows 26 (of which only two can be seen in FIG. 4) are formed at approximately 90 degree intervals. On the outer circumferential surface of the housing 20, two grooves 27a and 27b to which the O-rings 91 and 92 are attached are formed. Note that FIG. 4 shows a state where the O-rings 91 and 92 are respectively attached to the grooves 27a and 27b.

The coupling nut 30 has a cylinder shape with greater diameter than the housing 20, and is attached on the outside of the housing 20. FIG. 4 shows a state where the coupling nut 30 is attached to the housing 20. As shown in FIG. 3, attachment is made by a convex section 31 formed to protrude on the inner circumferential surface of the coupling nut 30 engaging with a concave section 28 formed on the outer circumferential surface of the housing 20. An annular space is formed between the coupling nut 30 and the housing 20.

Figure 5A:
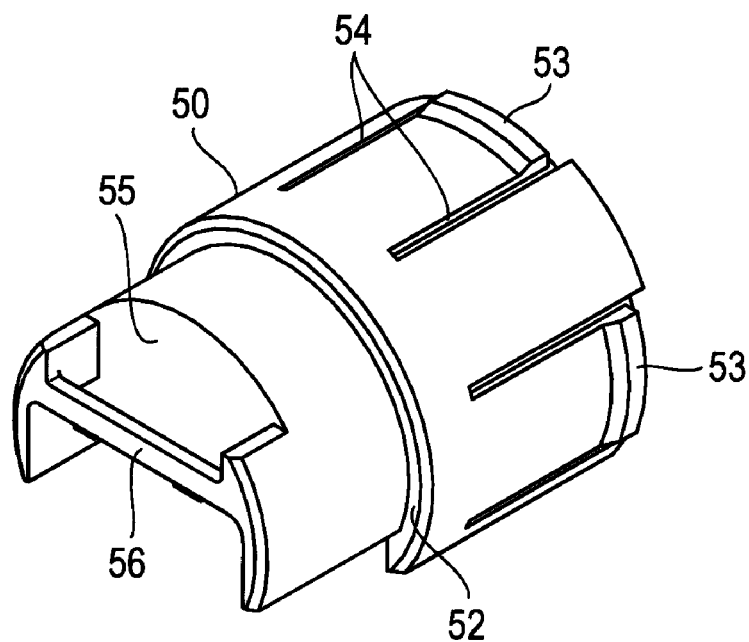
FIG. 5A is a perspective view of a stopper when seen diagonally from above.
Figure 5B:
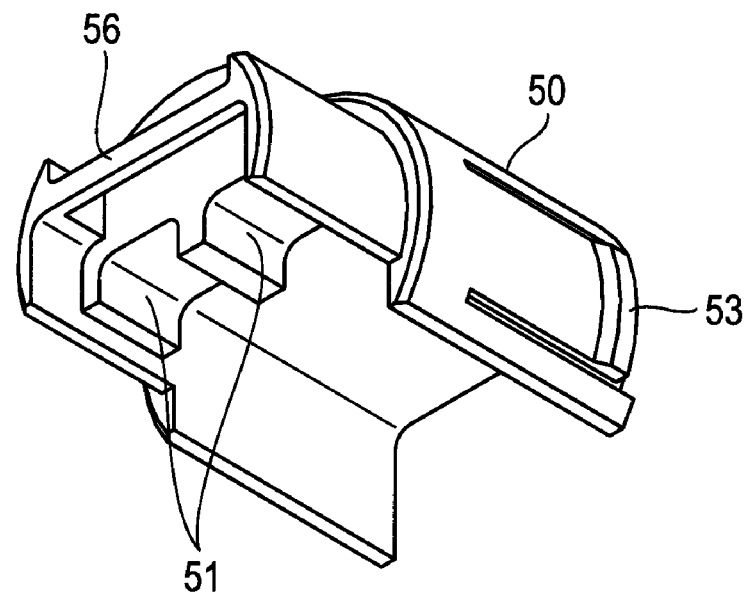
FIG. 5B is a perspective view of the stopper when seen diagonally from below.

As shown in FIGS. 5A and 5B, the stopper 50 has a cylinder body which was hallowed in the axial direction thereof on a large scale. The cylinder body has a step, and the diameter is smaller at the front side than the rear side of a step section 52. In a portion on the front side of the step section 52, two grooves 51 which accommodate the optical fiber 210 are formed. On the outer circumferential surface on the rear end side of the stopper 50, three engagement convex sections 53 are formed to protrude and engage with the three engagement windows 26 of the housing 20, respectively. On both ends in the circumferential direction of each engagement convex section 53, a slit 54 is formed to extend forward. The slit 54 enables the engagement convex section 53 to be pushed and displaced inward. A front surface 55 of the stopper 50 is formed with a coupling section 56 extending parallel to and at a predetermined distance from the front surface 55 and having both ends supported and fixed.

The end bell 60 has a cylinder shape which is tapered at the rear end. On the outer circumferential surface of a small diameter section 61 next to this taper, a thread is formed.

The gland nut 70 has a cylinder shape and, at the front end side inner circumferential surface thereof, is formed with a thread which engages with the thread of the small diameter section 61 of the end bell 60. An inner diameter on the rear end side is small, and approximately half of the circumference is cut out in the shape of this portion.

The clamp saddle 80 has an arc shape which engages with a rear end side cut-out section 71 of the gland nut 70, and is screwed and fixed to the cut-out section 71 of the gland nut 70 with two screws 95.

Next, assembly of the respective sections is described.

The gland nut 70 and the end bell 60 are fit around the optical fiber cable 200 in advance. Two optical fibers 210 are taken out from the optical fiber cable 200, and the optical connector 10 is attached to terminals of the optical fiber 210.

Figure 6A:
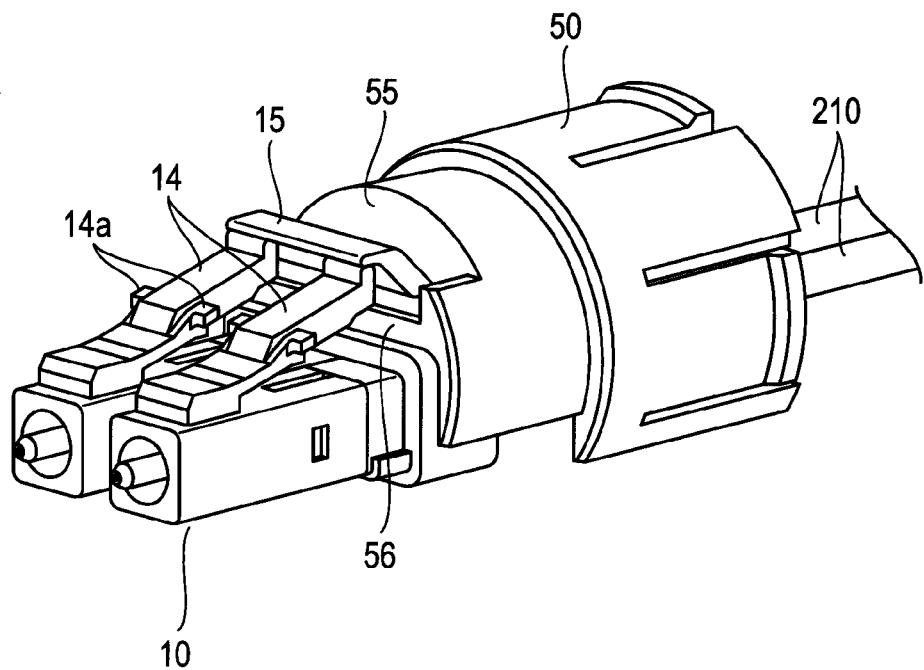
FIG. 6A is a view for illustrating assembly of an optical connector and the stopper.
Figure 6B:
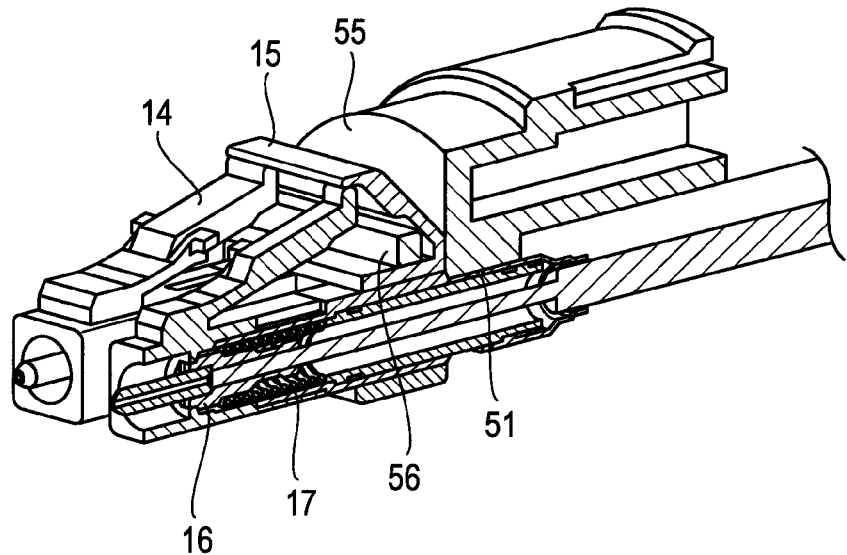
FIG. 6B is a view for illustrating assembly of the optical connector and the stopper.

Next, as shown in FIGS. 6A and 6B, the stopper 50 is arranged on the rear end side of the optical connector 10. At this time, the two optical fibers 210 are accommodated respectively in the grooves 51 so as to pass through the two grooves 51 of the stopper 50. The coupling section 56 is formed on the front surface 55 of the stopper 50, and the optical connector 10 and the stopper 50 are coupled and fixed by passing the clip piece 15 of the optical connector 10 through a gap between the coupling section 56 and the front surface 55. Note that such a positional relation between the coupling section 56 and the clip piece 15 can be achieved by tilting the stopper 50 and causing the coupling section 56 to enter on the inside of the clip piece 15 (i.e., a space between the clip piece 15 and the latch piece 14) from the free end side of the clip piece 15. Note that, in the optical connector 10 in FIG. 6B, reference numeral 16 denotes a ferrule frame, and reference numeral 17 denotes a coil spring biasing the ferrule frame 16 holding the ferrule 13 forward.

Figure 7:
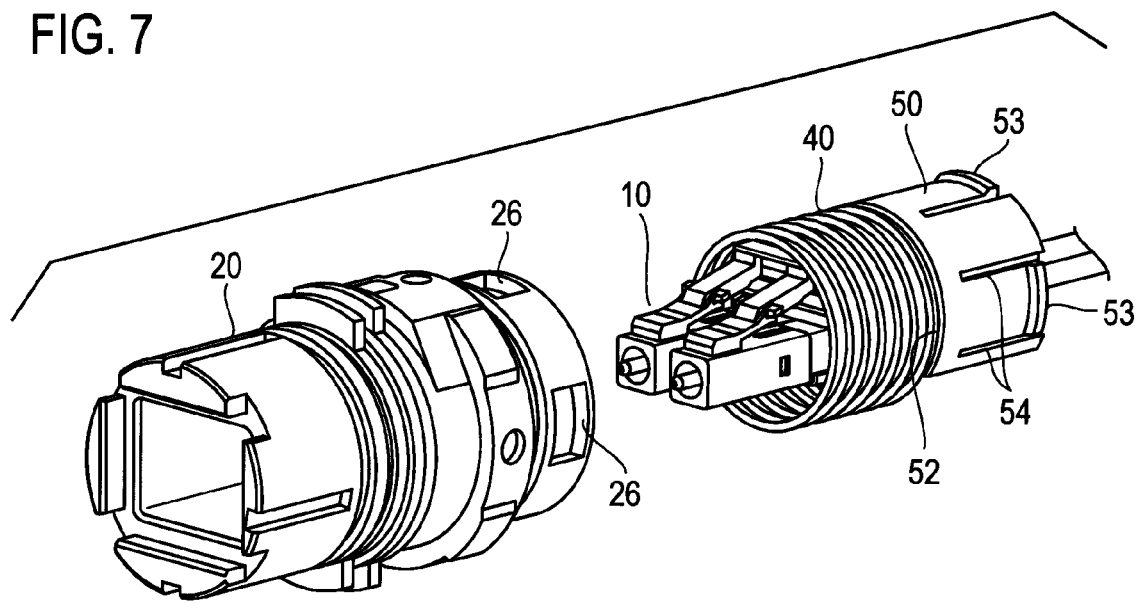
FIG. 7 is a view for illustrating attachment of a coil spring.

Next, as shown in FIG. 7, the coil spring 40 is fit around the optical connector 10 from the front end side. The rear end of the coil spring 40 is made to contact the step section 52 of the stopper 50, and the optical connector 10 is placed inside the coil spring 40.

Figure 8:
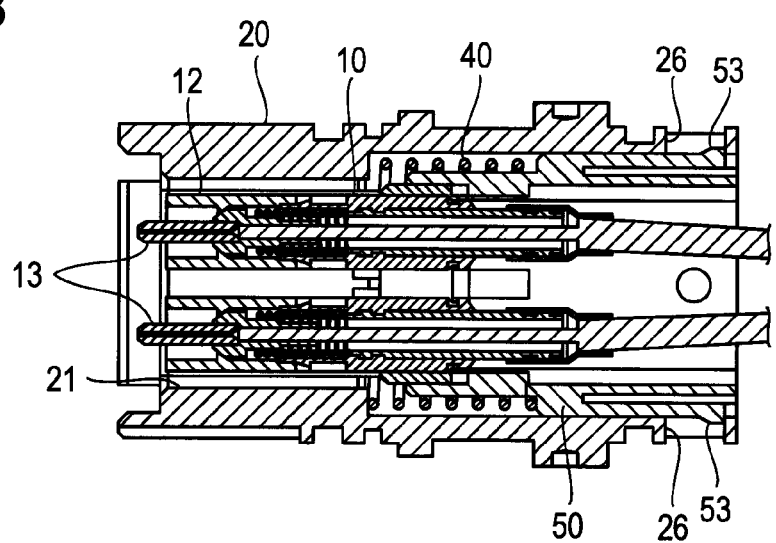
FIG. 8 is a view for illustrating an engaged state of a housing and the stopper.

Next, the housing 20 is attached to the optical connector 10 from the front end side. Attachment of the housing 20 is made by engaging the engagement windows 26 respectively to the engagement convex sections 53 of the stopper 50. FIG. 8 shows a state where the engagement convex sections 53 of the stopper 50 are engaged with and arranged in the engagement windows 26 of the housing 20. Since the length of the engagement window 26 in the axial direction (inserting direction of the optical connector 10) is greater than that of the engagement convex section 53, the housing 20 is accordingly displaceable with respect to the stopper 50 by a predetermined amount in the inserting direction of the optical connector 10. Note that the front end of the coil spring 40 is made to contact the rear wall surface of the opening section 21 of the housing 20, and the stopper 50 is biased rearward by the coil spring 40.

By the housing 20 being attached in a manner described above, the two sleeves 12 of the optical connector 10 are placed and accommodated in the opening section 21 of the housing 20, as shown in FIG. 8. Note that the end of the ferrule 13 arranged in the sleeve 12 is placed in the opening section 21 without protruding from the end (front end) of the housing 20, as shown in FIG. 8, in this example.

Next, the O-rings 91 and 92 are attached to the grooves 27a and 27b of the housing 20. Further, the convex section 31 of the coupling nut 30 is engaged with the concave section 28 to attach the coupling nut 30 to the housing 20.

Figure 9:
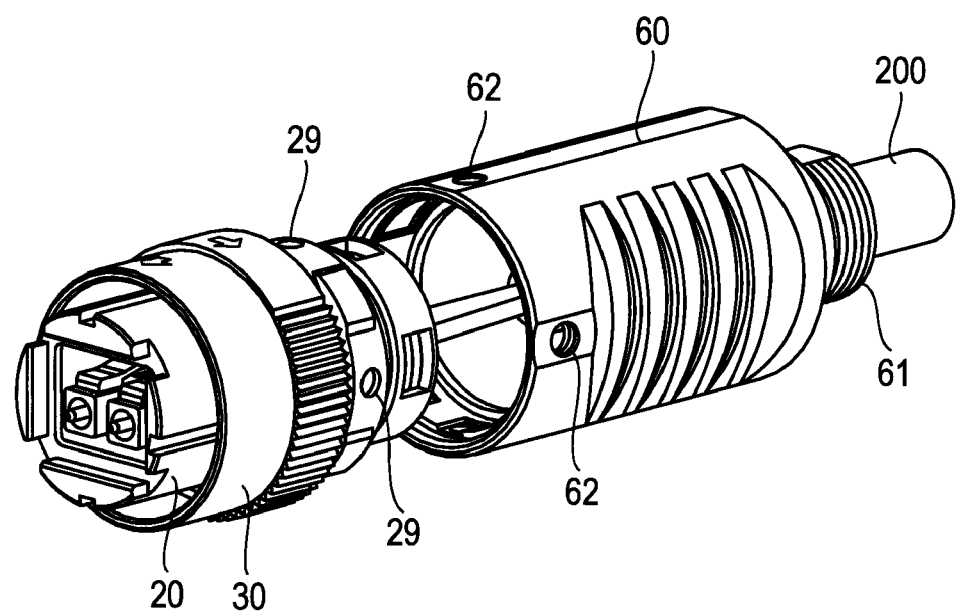
FIG. 9 is a view for illustrating assembly of the housing and an end bell.

Next, the end bell 60 which has been fit around the optical fiber cable 200 in advance is fixed to the housing 20. Fixing is performed with four screws 96, such that the screw 96 is engaged with a screw hole 62 which is formed at the front end of the end bell 60 as shown in FIG. 9, and the end of the screw 96 is inserted and placed into a hole 29 formed in the housing 20. Note that the screw 96 is a hexagon socket screw, as shown in FIG. 2.

Finally, the gland nut 70 is engaged with and attached to the small diameter section 61 of the end bell 60, and the clamp saddle 80 is screwed and fixed to the cut-out section 71 of the gland nut 70 using the screw 95 such that the optical fiber cable 200 is enclosed. Thus, the optical connector plug 100 shown in FIGS. 2 and 3 is completed.

In the optical connector plug 100 configured in a manner described above, the free end of the clip piece 15 of the optical connector 10 is, as shown in FIG. 3, placed at the inclination surface 23a of the concave section 23 formed on the rear end inner wall surface of the opening section 21 of the housing 20.

Figure 10A:
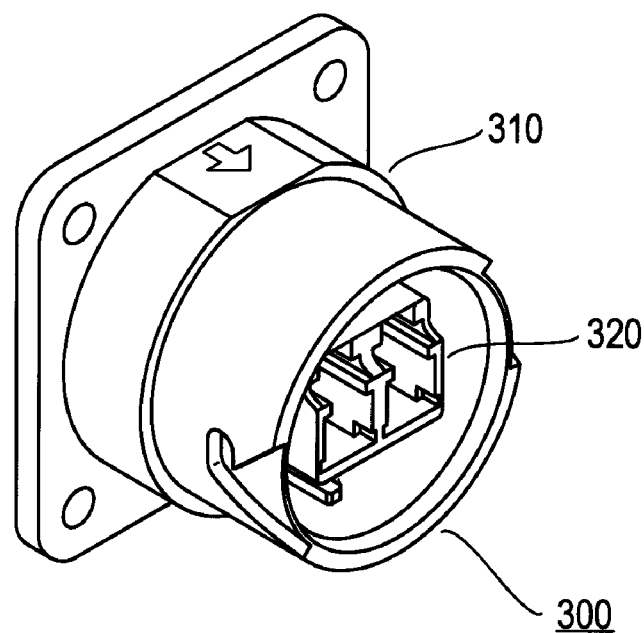
FIG. 10A is a perspective view showing the external appearance of a receptacle.
Figure 10B:
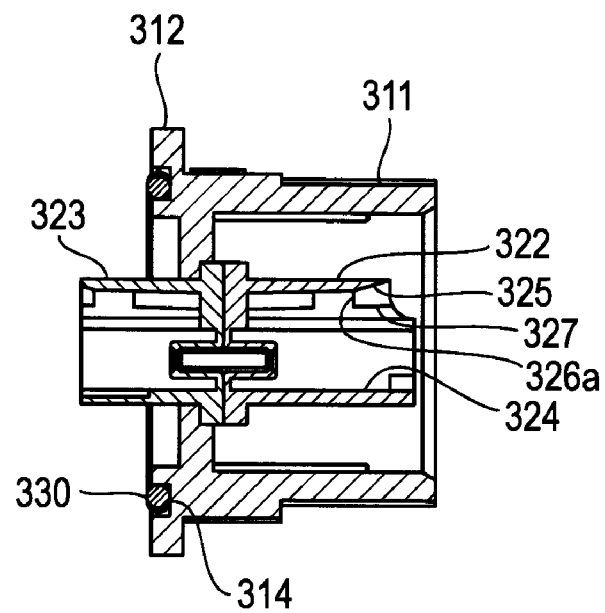
FIG. 10B is a sectional view of the receptacle shown in FIG. 10A.
Figure 11:
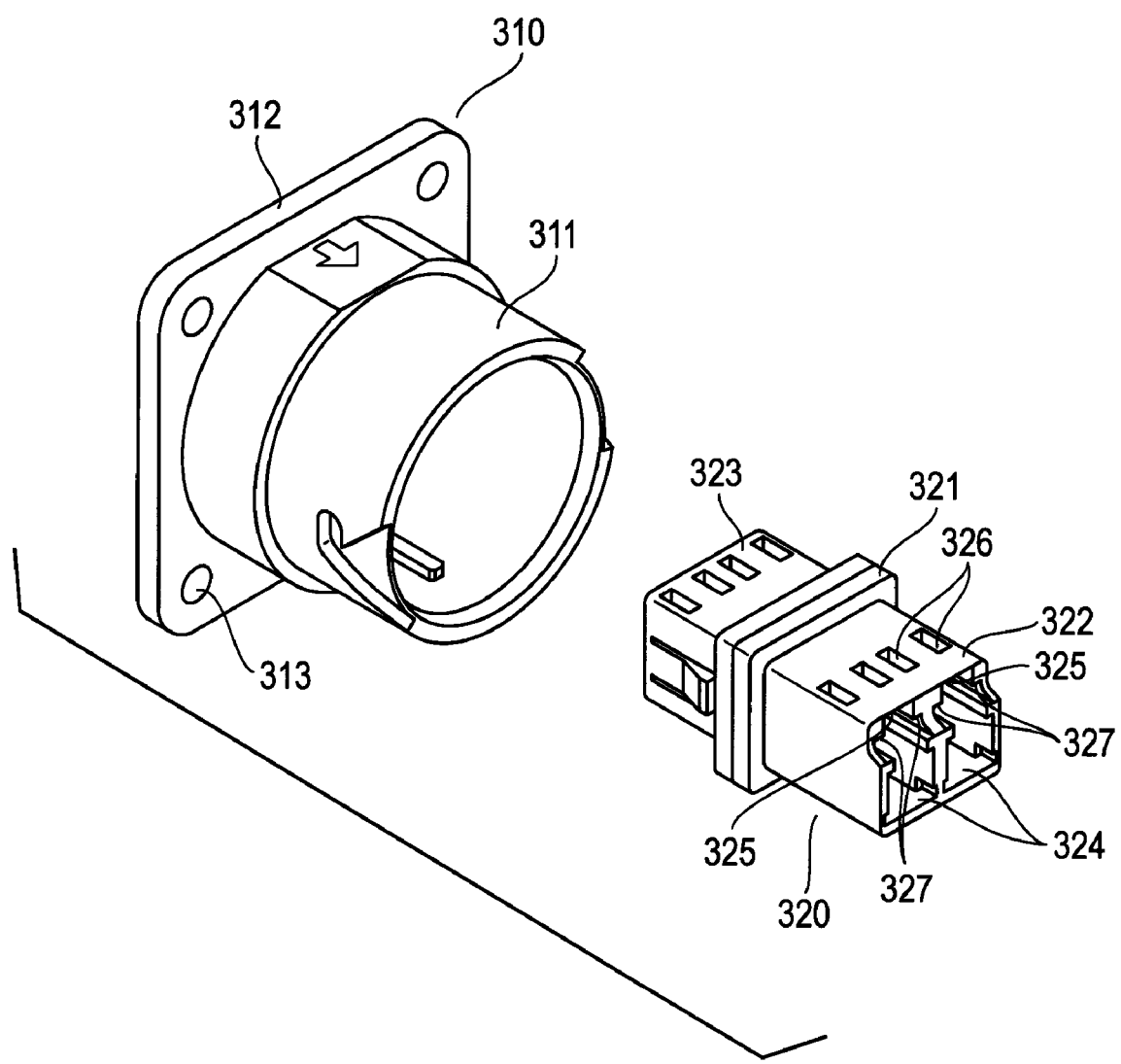
FIG. 11 is an exploded perspective view of the receptacle shown in FIG. 10A.

Next, the configuration of a receptacle to which the optical connector plug 100 described above is connected is described with reference to FIGS. 10A, 10B, and 11. FIG. 10A shows the external appearance of the receptacle, and FIG. 10B shows the sectional structure. FIG. 11 shows the receptacle disassembled.

A receptacle 300 is configured of a receptacle shell 310 and an adapter 320. The adapter 320 is for a two-fiber connector in this example, and includes a base section 321 and box-shaped connecting sections 322 and 323 respectively formed to protrude on both sides of the base section 321. The connecting section 322 is formed with two rectangular-shaped openings 324 corresponding to the two sleeves 12 of the optical connector 10. The optical connector 10 of the optical connector plug 100 is inserted and connected to this connecting section 322. Note that another optical connector which is to be optically connected to the optical connector 10 is inserted and connected to the other connecting section 323.

In the middle in the width direction of the upper wall surface of each opening 324, an inclination surface 325 is formed for introduction to the open end. A pressing section 327 is formed on both sides of the inclination surface 325 on the upper wall surface of each opening 324. On the far side of the pressing section 327, a through hole 326 is formed through an upper wall section. A portion where the through hole 326 on the far side of the pressing section 327 is located functions as an engaging section 326a which engages with the protrusion 14a of the latch piece 14 of the optical connector 10.

The receptacle shell 310 includes a cylinder section 311 and a rectangular-shaped flat plate section 312 provided at one end of the cylinder section 311. The adapter 320 is accommodated and fixed in the receptacle shell 310. The flat plate section 312 is provided, at four corner sections, with an attachment hole 313 which is used when the receptacle 300 is attached to, for example, a case or the like. Note that, in FIG. 10B, reference numeral 330 denotes an O-ring arranged in a groove 314 of the flat plate section 312.

Connection and detachment of the optical connector plug 100 with respect to the receptacle 300 are described below.

Figure 12:
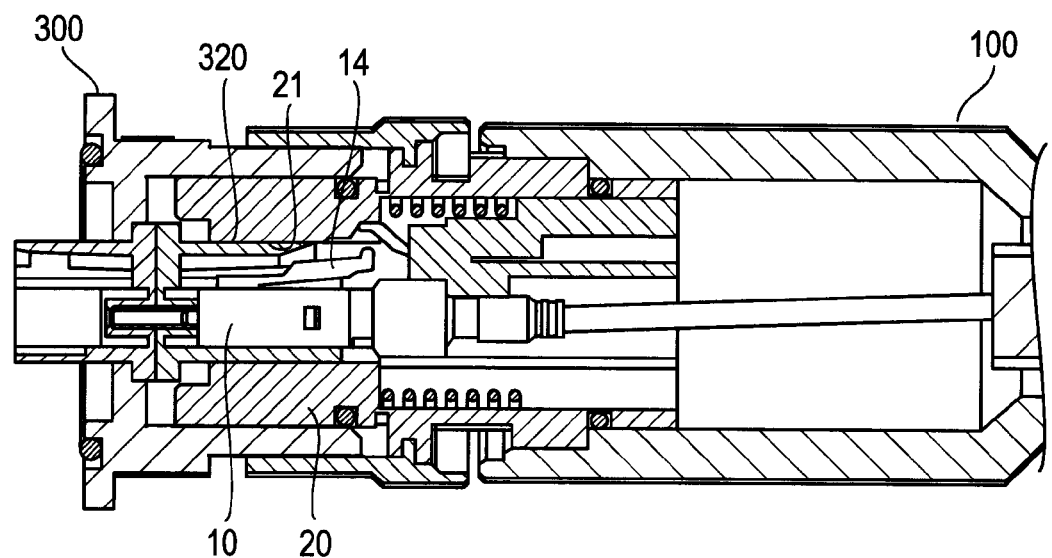
FIG. 12 is a sectional view showing a state where the connection of the optical connector plug with respect to the receptacle is in process.
Figure 13:
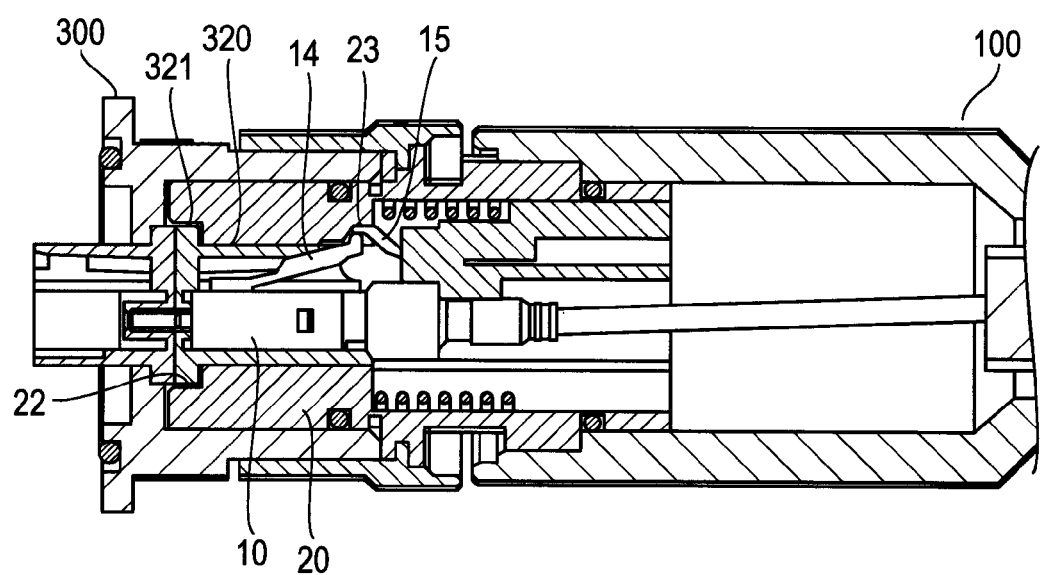
FIG. 13 is a sectional view showing a state where the connection of the optical connector plug with respect to the receptacle is completed.
Figure 14:
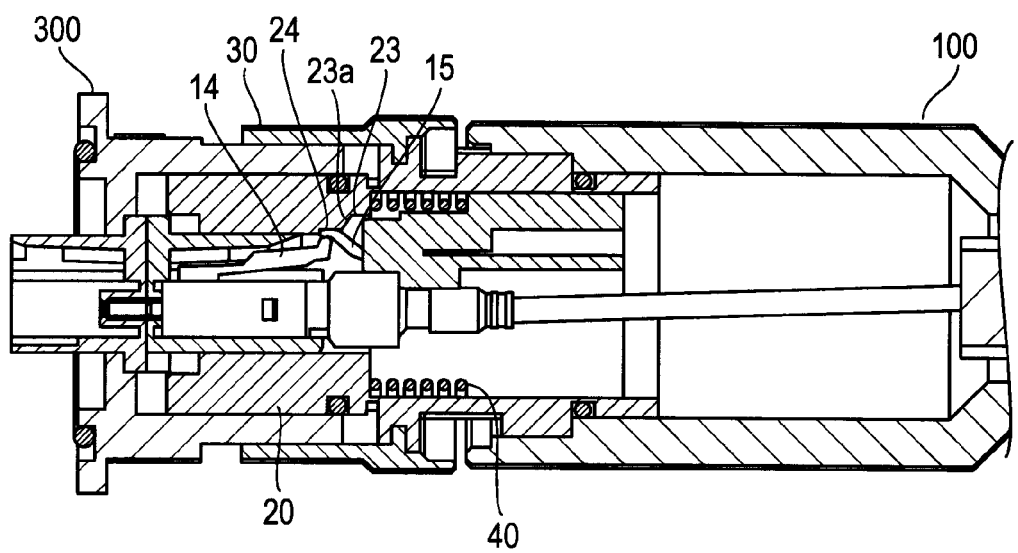
FIG. 14 is a sectional view showing a state where the detachment of the optical connector plug from the receptacle is in process.
Figure 15:
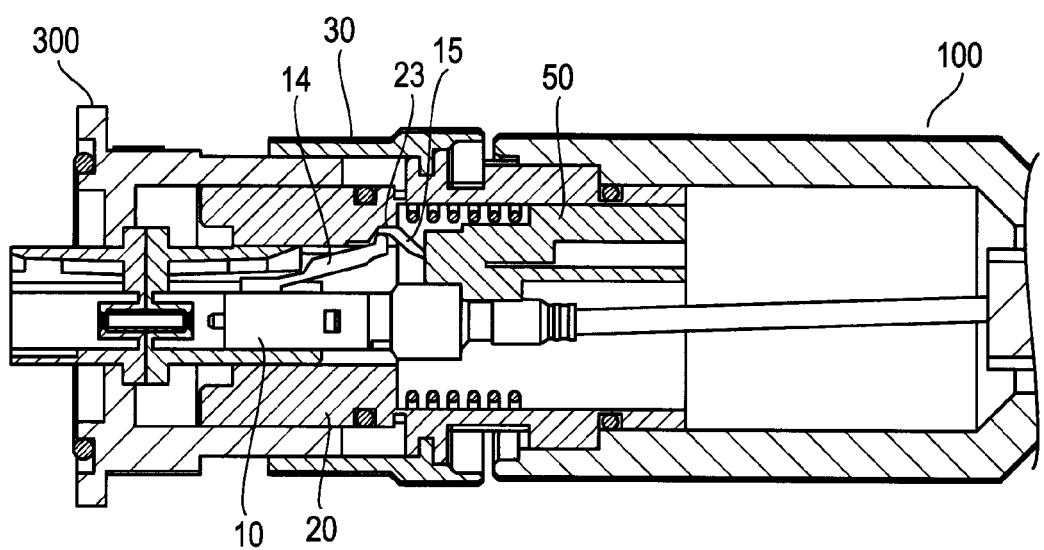
FIG. 15 is a sectional view showing a state where the stopper is biased and a latch piece has recovered to an original state in the detachment of the optical connector plug from the receptacle.

FIG. 12 shows a state where the connection of the optical connector plug 100 with respect to the receptacle 300 is in process, i.e., a state where insertion of the optical connector 10 to the adapter 320 is in process. FIG. 13 shows a state where the insertion of the optical connector 10 to the adapter 320 is completed and the connection of the optical connector plug 100 to the receptacle 300 is completed. FIGS. 14 and 15 show states where the optical connector plug 100 is being detached from the receptacle 300.

Figure 16:
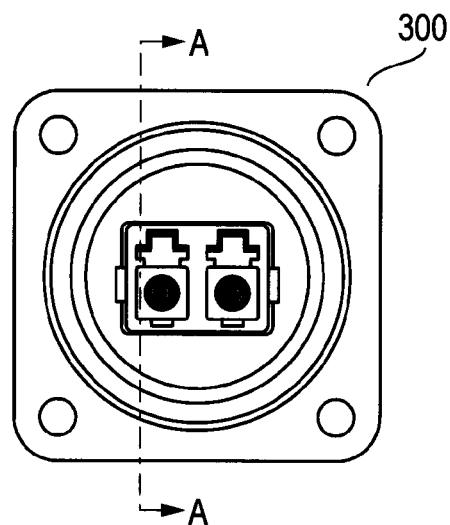
FIG. 16 is a front view of the receptacle shown in FIG. 10A.
Figure 17:
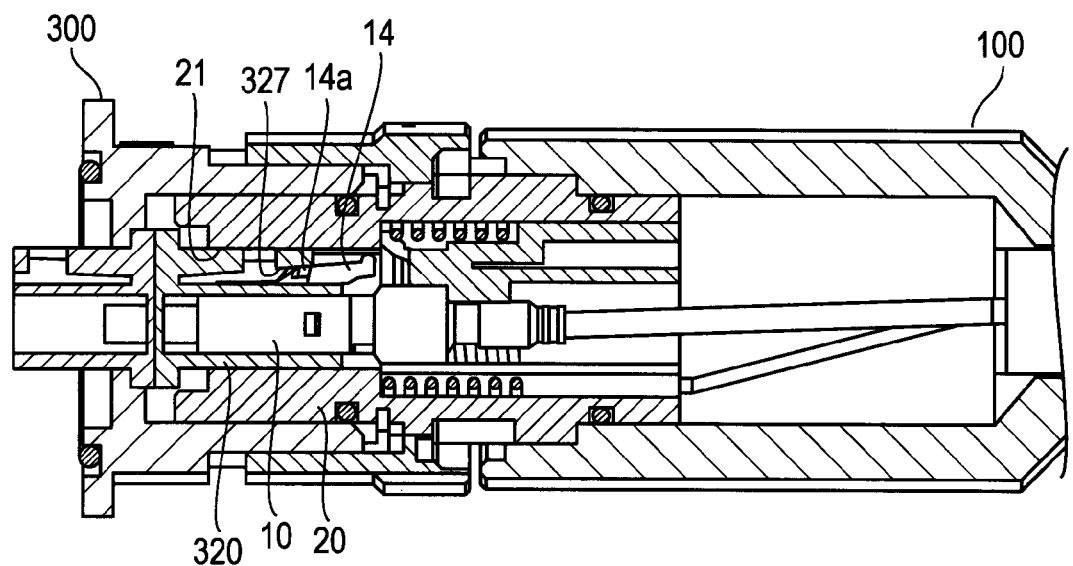
FIG. 17 is a sectional view of a state of FIG. 12 at a different position.
Figure 18:
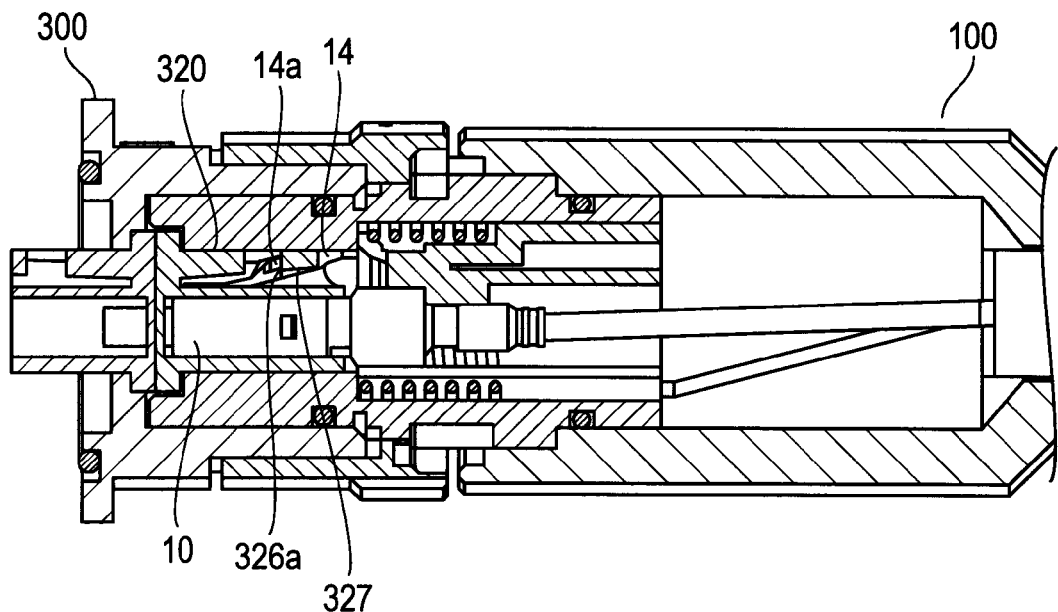
FIG. 18 is a sectional view of a state of FIG. 13 at a different position.
Figure 19:
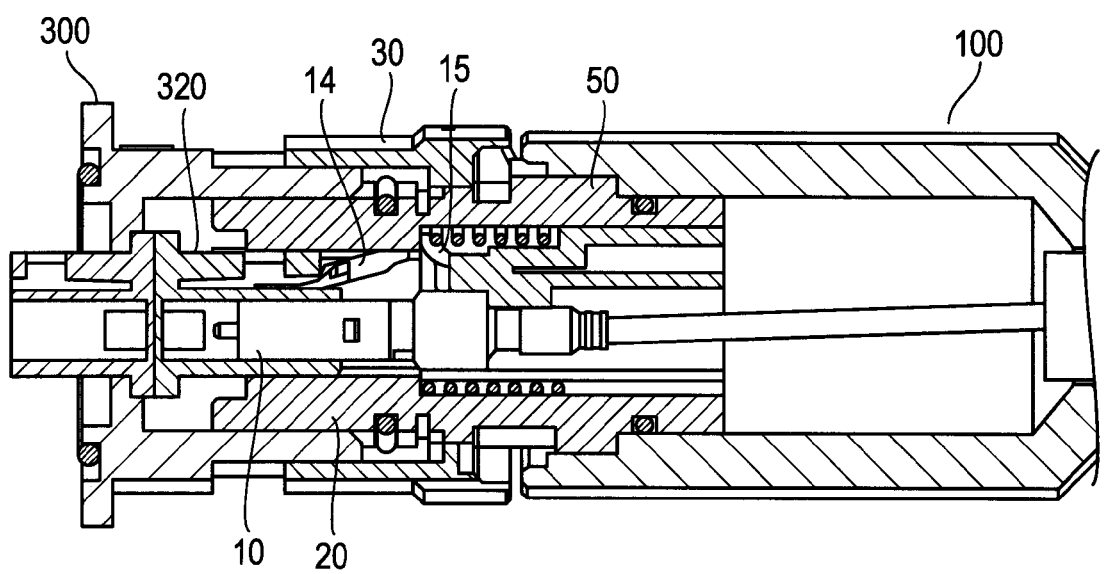
FIG. 19 is a sectional view of a state of FIG. 15 at a different position.

FIGS. 17 to 19 show sectional views, along line A-A in FIG. 16 in relation to the receptacle 300, at different sectional positions from those in FIGS. 12 to 15. FIGS. 17, 18, and 19 respectively correspond to states in FIGS. 12, 13, and 15.

<Connection>

The connection of the optical connector plug 100 is made by inserting the optical connector 10 to the adapter 320. By inserting the optical connector 10 to the adapter 320, the adapter 320 enters the opening section 21 of the housing 20, as shown in FIGS. 12 and 17. The pressing section 327 of the adapter 320 presses the protrusion 14a of the latch piece 14 as shown in FIG. 17, and the latch piece 14 is pushed down. Further, by inserting the optical connector 10 to the adapter 320, the pressing section 327 passes through the protrusion 14a and reaches the free end side of the protrusion 14a of the latch piece 14. The protrusion 14a is placed at the engaging section 326a on the far side of the pressing section 327, whereby the latch piece 14 recovers to an original state as shown in FIGS. 13 and 18, and the protrusion 14a engages with the engaging section 326a to lock the latch piece 14 to the adapter 320, thus completing the connection. Note that the step section 22 at the front end of the opening section 21 of the housing 20 is placed so as to encompass the circumference of the base section 321 of the adapter 320.

<Detachment>

When the optical connector plug 100 is to be detached, the housing 20 is displaced in a direction to be pulled out from the receptacle 300 as shown in FIG. 14 against the biasing force of the coil spring 40. In this example, the coupling nut 30 attached to the housing 20 is displaced in the direction to be pulled out. Accordingly, the free end of the clip piece 15 which has been placed at the inclination surface 23a of the concave section 23 of the housing 20 is pushed down by the inclination surface 23a of the concave section 23 being displaced as shown in FIG. 14. This causes the latch piece 14 to be pushed down, disengaging the protrusion 14a from the engaging section 326a to release the lock. Note that, at this time, a free end side portion of the clip piece 15 is placed at the step section 24 in front of the inclination surface 23a. When the lock of the latch piece 14 is released, the stopper 50, coupled and fixed with the optical connector 10 and receiving the biasing force of the coil spring 40, becomes displaceable and is at once displaced rearward. Accordingly, the optical connector 10 is also displaced rearward together with the stopper 50 and returns to an original position with respect to the housing 20, and the latch piece 14 and the clip piece 15 recovers to original states as shown in FIGS. 15 and 19. Further, displacing the coupling nut 30 in the direction to be pulled out causes the optical connector plug 100 to depart from the receptacle 300, thus completing the detachment.

As described above, when the optical connector plug 100 is to be detached from the receptacle 300 in this example, the detachment can be made by an operation of holding and simply pulling out the coupling nut 30 to release the lock of the latch piece 14. Thus, the detachment can be made easily in one motion in a similar manner to that at the time of connection.

Since the optical connector 10 is accommodated and protected in the housing 20, the optical connector 10 can be prevented from an accident causing unintended damage at the time of handling and is hardly stained.

Further, since the latch piece 14 is not pushed down and kept in the deformed state whether at the time of connection with the receptacle 300 or in a detached state from the receptacle 300, the latch piece 14 can be prevented from an accident causing plastic deformation or breakage due to a creep phenomenon.

Note that, in this example, the detachment from the receptacle 300 in one motion in a manner described above and reliable recovery of the latch piece 14 to the original state at the time is made possible by providing the stopper 50 to be coupled with and behind the optical connector 10 and providing the coil spring 40 biasing the stopper 50 rearward. Such use of the stopper 50 and the coil spring 40 does not affect the assembly. For example, since the inner diameter of the coil spring 40 is greater than the outer shape of the optical connector 10 including the latch piece 14 and the clip piece 15 when seen from the inserting direction of the optical connector 10, the coil spring 40 can be fit easily from the front side of the optical connector 10. That is, the coil spring 40 can easily be set between the stopper 50 and the housing 20, and assembly can be performed easily.

In addition, in this example, general products standardized in IEC 61754-20 are used for the optical connector 10 and the adapter 320 to which the optical connector 10 is inserted and connected, the optical connector 10 being an LC connector as well as a two-fiber connector complying with the IEC standard. In other words, a dedicated optical connector for applying this invention does not need to be prepared, and cost can be saved in this regard.

Further, in this example, the O-rings 91 and 92 are attached as waterproof sealing members in two parts of the optical connector plug 100, whereby a waterproof structure can be realized at the time of connection with the receptacle 300.

What is claimed is:

1. An optical connector plug which houses an optical connector to be inserted and connected to an adapter and which is to be connected to a receptacle holding the adapter, the optical connector plug comprising:
   a latch piece formed on a surface of the optical connector, having a front end in an inserting direction toward the adapter as a fixed end and a rear end as a free end, extending so as to depart gradually from the surface, and including at a middle portion a protrusion which protrudes on both sides in a width direction;
   a clip piece formed on the surface, having a rear end in the inserting direction as a fixed end and a front end as a free end, the free end being placed on the free end of the latch piece;
   a stopper arranged on a rear end side in the inserting direction of the optical connector and coupled and fixed with the optical connector;
   a housing which engages with the stopper so as to be displaceable by a predetermined amount in the inserting direction with respect to the stopper and which accommodates the optical connector in an opening section at front in the inserting direction; and
   a biasing member which biases the stopper rearward in the inserting direction with respect to the housing;
   wherein the free end of the clip piece is placed on an inclination surface at a front end in the inserting direction of a concave section formed on an inner wall surface of the opening section;
   the latch piece is, at a time of connection with the receptacle, pushed down by the protrusion being pressed by a pressing section provided to the adapter entering into the opening section, recovers to an original state by the pressing section passing through the protrusion, and is locked to the adapter by the protrusion being placed at an engaging section formed on a far side of the pressing section; and
   at a time of detachment from the receptacle, the housing is displaced against a biasing force of the biasing member whereby the clip piece together with the latch piece are pushed down by the inclination surface to release a lock to the adapter, and, after release of the lock, the latch piece and the clip piece recover to original states by the stopper being displaced by the biasing force of the biasing member.

2. The optical connector plug according to claim 1, wherein the biasing member is a coil spring of which an inner diameter is greater than an outer shape of the optical connector including the latch piece and the clip piece when seen from the inserting direction.

3. The optical connector plug according to claim 1, wherein the housing is arranged with a sealing member which realizes a waterproof structure at the time of connection with the receptacle.

4. The optical connector plug according to any one of claims 1 to 3, wherein the optical connector is an optical connector standardized in IEC 61754-20.

* * * * *